United States Patent [19]

McMahan et al.

[11] Patent Number: 4,709,305
[45] Date of Patent: Nov. 24, 1987

[54] ELECTRICAL CONNECTOR FOR HEADLIGHT ASSEMBLY

[75] Inventors: David R. McMahan; John D. Geddie, both of Anderson, Ind.

[73] Assignee: General Motors Corporation, Detroit, Mich.

[21] Appl. No.: 915,047

[22] Filed: Oct. 3, 1986

[51] Int. Cl.⁴ ............................................. B60Q 1/00
[52] U.S. Cl. ..................................... 362/61; 362/296; 362/267; 362/457
[58] Field of Search .................... 362/61, 95, 226, 369, 362/457; 339/59 R, 61 R, 61 M, 62, 63 R, 59 L, 61 C, 61 L, 93 R, 102 L

[56] References Cited

U.S. PATENT DOCUMENTS

| | | |
|---|---|---|
| 2,219,770 | 10/1940 | Falge et al. . |
| 2,683,258 | 7/1954 | Churchill . |
| 2,705,308 | 3/1955 | Howard . |
| 2,712,120 | 6/1955 | Cochran . |
| 4,264,114 | 4/1981 | Chandler ........................ 339/184 M |
| 4,344,120 | 8/1982 | Bradley et al. ................. 362/267 X |
| 4,473,770 | 9/1984 | Baba et al. . |
| 4,482,942 | 11/1984 | Blaisdell et al. ................ 362/296 X |
| 4,588,248 | 5/1986 | Moore . |
| 4,635,174 | 1/1987 | Montet ............................... 362/457 |

FOREIGN PATENT DOCUMENTS 6406978 6/1964 Netherlands .

Primary Examiner—Larry Jones
Attorney, Agent, or Firm—Patrick M. Griffin

[57] ABSTRACT

An improved electrical connector for use with a headlight assembly of the type in which the headlight is sandwiched between a bezel and a housing with an inner surface of the housing overlying the back surface of the headlight with an access hole in the housing opening to the headlight terminals. The electrical connector compensates for angular tolerance variations in the headlight terminals that can cause a variance in the spatial relation between the connector and the housing. The connector includes a pliant sealing boot surrounding a rigid socket, with ears of the socket contained within pockets of the sealing boot, cooperatively forming composite compression pads of a dual flexibility. The inner surface of the housing directly compresses the less rigid sealing boot pockets before flexing the more rigid socket ears, transferring and distributing the force of the compression evenly to the sealing boot to both conform the sealing boot to the headlight back surface and to positively retain the connector in place. By initially compressing the less rigid sealing boot pockets, any variation in the spacing of the socket ears from the inner surface of the housing caused by an angular variation in the headlight terminals is absorbed and compensated.

3 Claims, 4 Drawing Figures

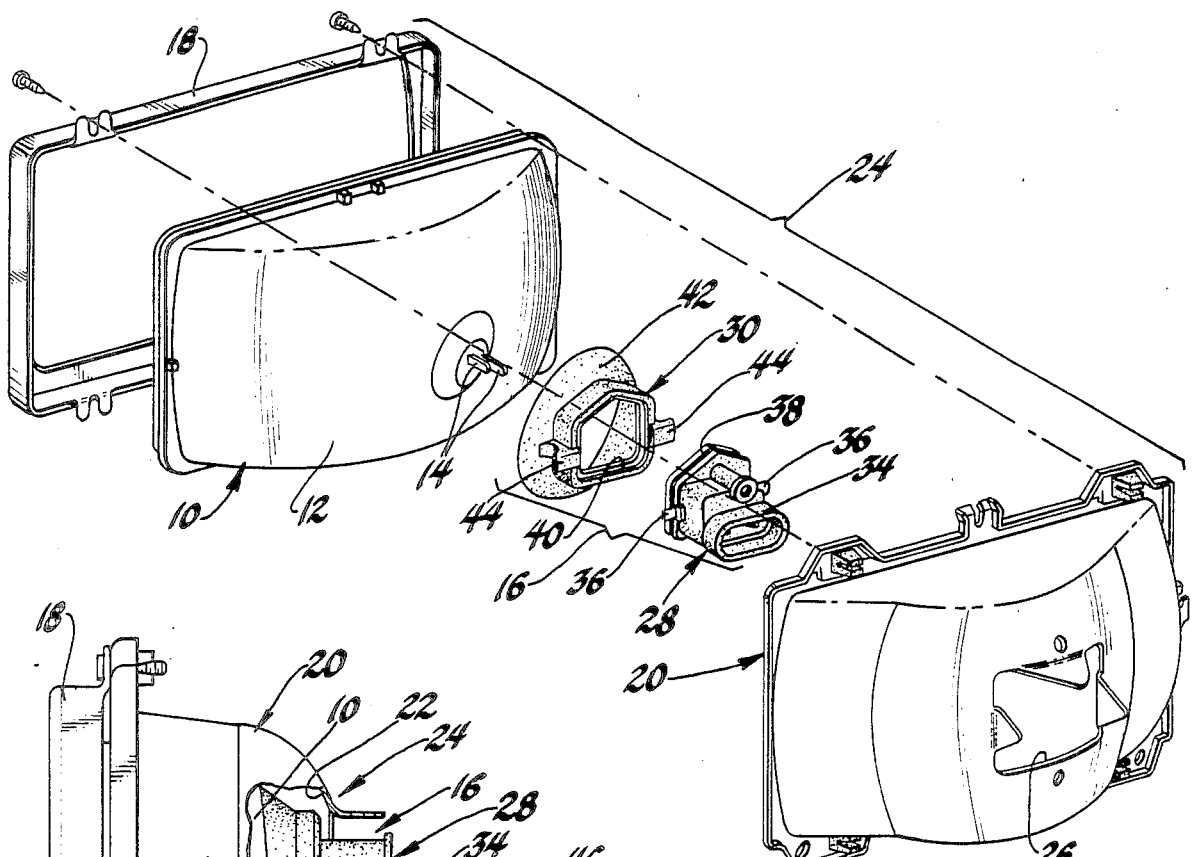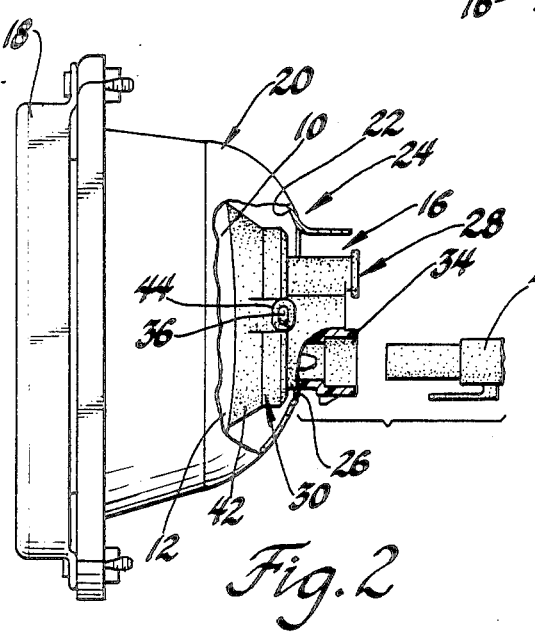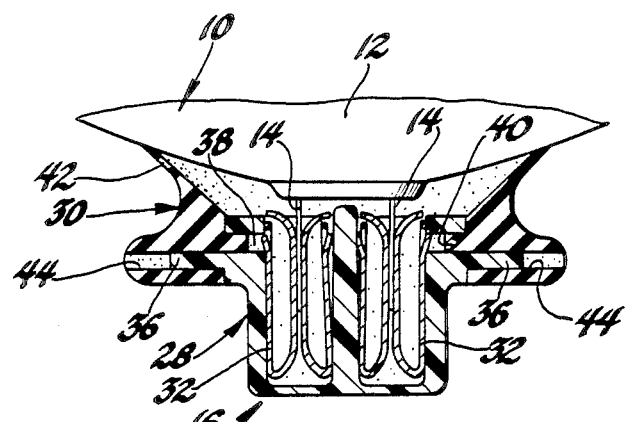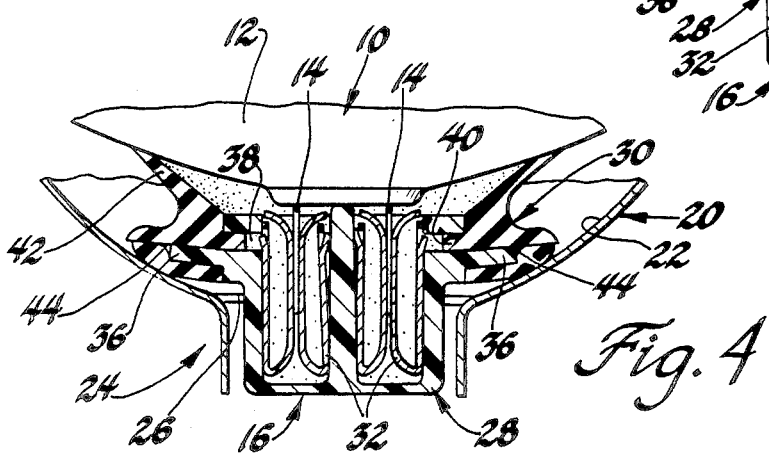

ELECTRICAL CONNECTOR FOR HEADLIGHT ASSEMBLY

This application relates to electrical connectors for vehicle headlights in general, and specifically to an improved electrical connector for use with a headlight that is mounted to the vehicle as part of a headlight assembly that has an inner surface overlying the back surface of the headlight.

BACKGROUND OF THE INVENTION

The typical vehicle headlight has a partially spherical back surface from which extends a pair or more of male terminals which are in turn connected to the vehicle electrical system by a suitable electrical connector. A typical electrical connector consists of a molded plastic socket containing female terminals that grip the male headlight terminals as the socket is plugged to the headlight. The socket must be formed of a material rigid enough to maintain the socket terminals aligned in the proper position to engage the headlight terminals as the socket is plugged to the headlight. The socket will therefor take on an angular orientation relative to the headlight that substantially matches the angle of the headlight terminals. While the headlight terminals are nominally coaxial with the headlight, in practice they are subject to manufacturing tolerances that can vary their angle, and are also subject to bending during shipping and handling. The angle of the socket relative to the headlight will consequently be subject to the same variation. If sealing around the headlight terminal is desired, a separate seal of a less rigid and more conformable material than the socket material must be provided. A seal could be provided by a conventional O ring, which would be compressed by the socket against the back surface of the headlight. However, any compressive force to keep the seal conformed would have to come entirely from the mutual gripping force of the socket and headlight terminals. Consequently, such a seal is impractical with a conventional connector.

Conventionally, the headlight is mounted to the vehicle before the connector is plugged to the headlight. The headlight is generally not mounted to the vehicle by itself, but rather as part of a headlight assembly that includes a front bezel and a rear stamped metal housing. The headlight is first sandwiched between the bezel and the housing to complete the headlight assembly, which can be separately handled more conveniently than the headlight alone. The housing has a partially spherical shape with an inner surface that generally matches the shape of the back surface of the headlight and which is spaced therefrom. The headlight assembly in then mounted to the vehicle by attaching it to the vehicle with adjustable screws that hold the housing up against several vehicle mounted bearing pads. Turning the adjusting screws causes the housing to slide over the pads, thereby aiming the headlight. A hole through the housing gives access to plug the electrical connector socket to the headlight. However, with the headlight assembly already mounted, access to the headlight terminals may be difficult as a practical matter, and plugging the connector to the headlight is not made easier by the strong mutual gripping force necessary between the headlight and socket terminals.

In the conventional headlight assembly, the housing does nothing to positively retain the socket to the headlight. Although the inner surface of the housing overlies the back surface of the headlight, it performs no function as such. Any attempt to use the housing to positively retain the socket to the headlight would be complicated by the fact that the orientation of the socket relative to the housing, spatially and angularly, would vary with the angular variance of the headlight terminals. A designer could not count on a constant relation between the socket and the housing to allow the two to structurally cooperate.

SUMMARY OF THE INVENTION

The invention provides an improved electrical connector for use with a vehicle headlight assembly of the type described above. The electrical connector of the invention is positively retained to the headlight in cooperation with the housing, and provides a seal around the headlight terminal that is also maintained in sealing engagement with the headlight by the housing. The positive retention is provided in a way that compensates for the spatial variation of the socket relative to the housing caused by the angular variation of the headlight terminals relative to the headlight.

The electrical connector of the invention includes a molded plastic socket that is plugged to the headlight before the headlight assembly is completed and mounted to the vehicle. The socket has passages therein that hold terminals designed to grip the headlight terminals. The plastic of the socket is relatively hard, as it must be sufficiently rigid to maintain the socket terminals in the proper position to matingly engage the headlight terminals. The mating terminals of the socket need not grip the headlight terminals as strongly as in the conventional connector described above, however, only strongly enough to create good electrical contact. In the embodiment disclosed, the socket terminals are also adapted to be connected to the vehicle electrical system after the headlight assembly has been mounted to the vehicle, as a final step. The socket also includes a beam portion extending therefrom that is sufficiently thin so as to be flexible despite the rigidity of the socket material, and which underlies the inner surface of the housing in the completed headlight assembly. In the embodiment disclosed, the beam portion comprises two diametrically opposed ears integrally molded with the socket and extending out therefrom with a width greater than the width of the access hole through the housing. Given the possible variation in the angular orientation of the socket caused by the headlight terminals, the spacing of the underlying socket ears relative to the inner surface of the housing can also vary. The connector of the invention compensates for that variance.

The connector also includes a surrounding sealing boot that is fitted to the outside of the socket. The sealing boot is formed of a material that is less rigid and more pliable than the socket. The sealing boot includes a conical skirt that surrounds the headlight terminal and which lightly engages the back surface of the headlight after the socket is plugged to the headlight, but before the headlight assembly is completed. The sealing boot also includes a pair of pockets that fit over and contain the ears of the socket. Given the lesser rigidity of the sealing boot material, the socket ears and sealing boot pockets cooperate to form composite compression pads that have dual flexibility. The sealing boot pockets are sufficiently thick so that, as the headlight with attached connector is sandwiched between the bezel and housing, the inner surface of the housing directly engages the less rigid pockets, and compresses them first. The housing therefore only indirectly flexes the more rigid socket ears through the force of compression of the pockets. The flexing of the socket ears transmits the force of the compression to the socket, so that the housing positively retains the socket to the headlight, as opposed to just the conventional mutual gripping force of the terminals. The socket in turn distributes the compression force to the conical skirt of the surrounding sealing boot, which is thereby evenly conformed to the back surface of the headlight to seal around the headlight terminals. Any variation in the spacing of the socket ears from the inner surface of the housing is partially absorbed by the initial compression of the less rigid sealing boot pockets. Thus, the ultimate impact of the angular variation of the headlight terminals is lessened, and a useful cooperation between the housing and the connector socket is possible in spite of the varying relation between the two.

It is, therefore, a general object of the invention to provide an improved electrical connector for a vehicle headlight of the type that has a terminal extending from the back surface of the headlight at an angle that varies with manufacturing tolerances.

It is another object of the invention to provide such an improved electrical connector for use with a vehicle headlight that is mounted to the vehicle as part of a headlight assembly of the type that has an inner surface that overlies the back surface of the headlight, and which cooperates with that inner surface to positively retain the electrical connector to the headlight in such a way as to compensate for any spatial variation between that inner surface and the connector socket caused by the angular variation of the headlight terminal relative to the headlight.

It is yet another object of the invention to provide such an improved electrical connector that includes a socket adapted to be plugged to the headlight before the headlight assembly is completed, and in which the socket is formed of a material sufficiently rigid to retain a mating terminal in a proper position to matingly engage the headlight terminal as the socket is plugged on to the headlight, and in which the socket further has a beam portion extending therefrom that is sufficiently thin so as to be flexible and which underlies the inner surface of the completed headlight assembly, and which also includes a sealing boot surrounding the socket that is formed of a material less rigid than the socket so as to be conformable to the headlight back surface, with the sealing boot also having a pocket fitted over the socket beam portion so as to cooperatively form a composite compression pad of dual flexibility, whereby, as the headlight assembly is completed, the less rigid pocket is directly engaged by the headlight assembly inner surface and compressed first, thereby indirectly flexing the more rigid beam portion, which flexing in turn distributes the force of the compression to the socket to positively retain the socket to the headlight, the compression force in turn being distributed through the socket to the surrounding sealing boot so as to conform the sealing boot evenly to the headlight back surface to seal around the headlight terminal.

DESCRIPTION OF THE PREFERRED EMBODIMENT

These and other objects and features of the invention will appear from the following written description and the drawings, in which:

FIG. 1 is an exploded view of a headlight assembly and the electrical connector of the invention;

FIG. 2 is a side view of the completed headlight assembly partially broken away to show the electrical connector of the invention;

FIG. 3 is a view of part of the headlight with the electrical connector shown in cross-section and plugged to the headlight, before the headlight assembly has been completed;

FIG. 4 is a view similar to FIG. 3, after the headlight assembly has been completed.

Referring first to FIG. 1, a conventional vehicle headlight is indicated generally at 10. Headlight 10 includes a glass body with a partially spherical back surface 12 from which extend a pair of metal male contact terminals 14, formed of copper alloy or some other conductive material. While the headlight terminals 14 are nominally coaxial with the headlight 10, in practice they are subject to manufacturing tolerances that can very their angle, and are also subject to bending during shipping and handling, being made of relatively thin metal. The electrical connector of the invention, the preferred embodiment of which is designated generally at 16, connects the headlight 10 to the vehicle electrical system in a manner more fully described below. However, it may be understood at this point that an electrical connector such as 16 will be subject to the same variation in angle as the headlight terminals 14, unless it is somehow inherently flexible enough to self compensate.

Referring next to FIGS. 1, and 2, the headlight 10 is not mounted to the vehicle separately. Instead, a front bezel 18 and a rear housing designated generally at 20 are used. Bezel 18 is sized to fit over the front edge of headlight 10. Housing 20 is sized so as to mate to bezel 18 around its outside edge, and is formed of stamped steel with an inner surface 22 of partially spherical shape that generally matches the shape of the headlight back surface 12. The headlight 10 is sandwiched between the front bezel 18 and the housing 20, giving a conveniently handled separate assembly, best seen in FIG. 2 and designated generally at 24. The headlight assembly 24 is then attached to the front of the vehicle body with adjustable screws that hold the housing 20 up against several vehicle mounted bearing pads, not illustrated. Turning the adjusting screws then causes the housing 20 to slide over the pads, allowing the headlight 10 to be selectively aimed. In the completed headlight assembly 24, housing inner surface 22 is spaced from and confronts the headlight back surface 12, as seen in FIG. 4. In the conventional case, the housing inner surface 22 performs no function. The housing 20 also includes a generally square access hole 26 therethrough which, in the conventional case, provides access for an electrical connector to be plugged to the headlight 10 after the assembly 24 has been mounted. In the invention, however, the electrical connector 16 is added before the headlight assembly 24 is completed and mounted to the vehicle, and the housing inner surface 22 is used to advantage.

Referring next to FIGS. 1, 2 and 3, the electrical connector 16 includes a socket, designated generally at 28, and a surrounding sealing boot, designated generally at 30. Socket 28 closely contains a pair of female terminals 32 which are sized to grip the male headlight terminals 14 and make electrical contact therewith. The mating terminals 32 need not grip the headlight terminals 14 as strongly as in a conventional connector, because the connector 16 is positively retained to the headlight 10 by the housing 20, as will appear. However, the plastic of socket 28 must be rigid enough to maintain the socket terminals 32 aligned and in the proper orientation to mate to the headlight terminals 14. That proper orientation of the terminals 32 allows socket 28 to be plugged to headlight 10 with a simple push fit, see FIG. 3. Also, in the embodiment disclosed, socket 28 is molded with a sleeve 34 that allows a separate connector to be plugged in, to complete the connection of the vehicle electrical system to the terminals 32, after the headlight assembly 24 has been mounted, as described below. For these reasons, as well as for general durability, it is necessary that socket 28 be molded of a substantially rigid material. Polyphenylene sulfide is used in the embodiment disclosed, which has a Rockwell hardness of R123. Socket 28 is thus too rigid to be inherently self compensating for any variance in the headlight terminals 14, and will instead take on an orientation substantially matching that of the headlight terminals 14. Socket 28 is likewise too rigid to provide its own seal around headlight terminals 14. Socket 28 is also molded with a beam portion, which includes a pair of diametrically opposed ears 36 integral with the socket 28 and extending therefrom with an end-to-end width greater than the width of the housing access hole 26. The ears 36 are sufficiently thin so as to be flexible despite the rigidity of the socket material, and, given their width, they underlie the housing inner surface 22 after the headlight assembly 24 has been completed. Finally, socket 28 is molded with a peripheral groove 38, which serves a purpose described next.

Referring next to FIGS. 1, and 2, sealing boot 30 is hollow and sized so as to be fitted tightly over the outside of socket 28, completing connector 16. An internal rib 40 fits into groove 38 to help retain sealing boot 30 to the outside of socket 28, as best seen in FIG. 3. A peripheral conical skirt 42 surrounds the headlight terminals 14 and lightly engages the headlight back surface 12 after the socket 28 has been plugged on to the headlight 10. Sealing boot 30, unlike socket 28, is molded of a pliant and conformable material, which, in the embodiment disclosed, is olefin elastomer with a durometer of approximately 70. The more pliant material of sealing boot 30 allows the skirt 42 to conform well to the headlight back surface 12 to provide a good seal around the headlight terminals 14, as will be described. Sealing boot 30 also includes a pair of pockets 44 that fit over and contain the socket ears 36. Given the lesser rigidity of sealing boot 30, the pockets 44 and internal ears 36 cooperate to form composite compression pads. The composite structure so formed has a dual flexibility, and operates in cooperation with housing 20, as will be described next.

Referring next to FIGS. 2, 3 and 4, after the socket 28 has been plugged to the headlight 10, the terminals 14 and 32 are in electrical contact, as seen in FIG. 3, but the conical skirt 42 may or may not be in engagement with the headlight back surface 12 all the way around headlight terminals 14, given the variant angle of the headlight terminals 14 and socket 28. Next, the headlight 10 with attached connector 16 is sandwiched between the bezel 18 and housing 20 to complete the headlight assembly 24 as has been described above, see FIG. 2. The pockets 44 are sufficiently thick that, as the headlight assembly 24 is completed, the housing inner surface 22 will directly engage them. Given the lesser rigidity of the pockets 44, the housing inner surface 22 compresses them first, only indirectly flexing the more rigid internal socket ears 36 through the force of compression of the pockets 44, see FIG. 4. The tension of the flexed socket ears 36 positively retains the socket to the headlight 10, as opposed to the conventional retention provided just by the mutual gripping of the terminals 14 and 32. The pliant and soft material of the sealing boot 30, although well suited as a sealing material, is not well suited to transmit and distribute the localized compression force of the pockets 44. However, the flexing of the socket ears 36 transmits that compression force to the socket 28, and in turn socket 28, in part through the rib 40, distributes the compression force to the conical skirt 42. The skirt 42 is thereby evenly conformed to the headlight back surface 12 to seal around the headlight terminals 14. Finally, the completed headlight assembly 24 is mounted to the vehicle as described above, and a separate harness connector 46 may then be plugged to the socket sleeve 34 to complete the connection of headlight 10 to the vehicle electrical system.

Given the possible angular variance of the headlight terminals 14 and its effect on the angle of the socket 28, there may be a consequent variation in the spacing of the socket ears 36 from the housing inner surface 22. That spatial variance is at least partially absorbed by the initial compression of the less rigid sealing boot pockets 44, so as to have less effect on the flexing of the ears 36. The composite compression pads, by compensating for any misalignment between the socket ears 36 and housing 20, make possible a useful cooperation between the housing 20 and the connector 16 regardless of the varying relation between the two. Thus, the ultimate impact of the angular variation of the headlight terminals 14 is lessened.

Variations of the preferred embodiment may be made within the spirit of the invention. For example, the function of the ears 36 could be served by another beam member, such as an integrally molded disk that extended all the way around the socket 28, and which fitted within a consequently larger pocket in the sealing boot 30. Such a disk, if flexible, would still distribute the compressive force to the socket 28 and ultimately to the conical skirt 42, and would likely also eliminate the need for the interfitting groove 38 and rib 40. A pocket extending all the way around the sealing boot 30 would also have the capability of sealing around the housing access hole 26. The pockets 44 need not contain the ears 36 internally, which could just fit over the ears 36 so as to confront the housing inner surface 22. But, by fitting inside the pockets 44, the socket ears 36 also help retain the sealing boot 30 to the socket 28. A headlight assembly having components different from the bezel 18 and housing 20 could be employed, so long as it had an inner surface like surface 22. The headlight assembly 24 disclosed, however, is commonly used to mount headlights, so the particular embodiment of the electrical connector 16 is particularly useful, taking advantage as it does of structure that previously served no particular purpose. The separate harness connector 46 is not absolutely necessary to the practice of the invention in the broadest sense, as the connector 16 could be directly connected to the vehicle electrical system by harness wiring integral with the socket terminals 32. The separate connector 46 is particularly convenient in most applications, however, as it allows the headlight assembly 24 to be mounted without the impediment of already attached harness wiring. Therefore, it will be understood that the invention is not intended to be limited to just the embodiment disclosed.

The embodiments of the invention in which an exclusive property or privilege is claimed are defined as follows:

1. In a vehicle headlight assembly of the type having a headlight with a terminal extending from the back surface of said headlight at an angle that varies with manufacturing tolerances, said headlight assembly also having an inner surface that overlies the back surface of said headlight, an improved electrical connector for said headlight that is positively retained to and sealingly engaged with said headlight and which compensates for said angle variation, comprising, a socket adapted to be plugged to said headlight before said headlight assembly is completed, said socket being formed of a material sufficiently rigid to maintain a mating terminal in a proper position to matingly engage said headlight terminal as said socket is plugged to said headlight, said socket further having a beam portion extending therefrom that is sufficiently thin so as to be flexible and which underlies said inner surface after said headlight assembly has been completed, and, a sealing boot surrounding said socket formed of a material less rigid than said socket so as to be conformable to said headlight back surface, said sealing boot having a pocket fitted over said socket beam portion so as to cooperatively form a compression pad of dual flexibility, whereby, as said said headlight assembly is completed, the less rigid pocket is directly engaged by said inner surface and compressed first, thereby indirectly flexing the more rigid beam portion, which flexing in turn distributes the force of said compression to said socket to positively retain said socket to said headlight, said compression force in turn being distributed through said socket to said surrounding sealing boot so as to conform said sealing boot evenly to said headlight back surface to seal around said headlight terminal, with any variation in the spacing of said socket beam portion from said headlight assembly inner surface being partially absorbed and compensated by the compression of the less rigid sealing boot pocket so as to lessen the impact of the angular variation of said headlight terminals.

2. In a vehicle headlight assembly of the type having a headlight with a terminal extending from the back surface of said headlight at an angle that varies with manufacturing tolerances, said headlight assembly also having a housing with an inner surface that overlies the back surface of said headlight with a headlight terminal access hole therethrough, an improved electrical connector for said headlight that is positively retained to and sealingly engaged with said headlight and which compensates for said angle variation, comprising, a socket adapted to be plugged to said headlight before said housing is added to said headlight assembly, said socket being formed of a material sufficiently rigid to maintain a mating terminal in a proper position to matingly engage said headlight terminal as said socket is plugged to said headlight, said socket further having a pair of opposed ears extending therefrom that are sufficiently thin so as to be flexible and which have and end to end width greater than said access hole so as to underlie said housing inner surface after said housing is added to said headlight assembly, and a sealing boot surrounding said socket formed of a material less rigid than said socket so as to be conformable to said headlight back surface, said sealing boot having a pair of pockets fitted over and containing said socket ears so as to help retain said sealing boot to said socket and so as to cooperatively form a compression pad of dual flexibility, whereby, as said housing is added to said headlight assembly, the less rigid pockets are directly engaged by said housing inner surface and compressed first, thereby indirectly flexing the more rigid socket ears, which flexing in turn distributes the force of said compression to said socket to positively retain said socket to said headlight, said compression force in turn being distributed through said socket to said surrounding sealing boot so as to conform said sealing boot evenly to said headlight back surface to seal around said headlight terminal, with any variation in the spacing of said socket ears from said housing inner surface being partially absorbed and compensated by the compression of the less rigid sealing boot pockets so as to lessen the impact of the angular variation of said headlight terminals.

3. In a vehicle headlight assembly of the type having a headlight with a terminal extending from the back surface of said headlight at an angle that varies with manufacturing tolerances, said headlight assembly also including a housing with an inner surface that overlies the back surface of said headlight with a headlight terminal access hole therethrough, an improved electrical connector for said headlight that is positively retained to and sealingly engaged with said headlight and which compensates for said angle variation, comprising, a socket adapted to be plugged to said headlight before said housing is added to the headlight assembly, said socket being formed of a material sufficiently rigid to maintain a mating terminal in a proper position to matingly engage said headlight terminal as said socket is plugged to said headlight, said socket further having a pair of opposed ears extending therefrom that are sufficiently thin so as to be flexible and which have and end to end width greater than said access hole so as to underlie said housing inner surface after said housing is added to said headlight assembly, and a sealing boot fitted over said socket formed of a material less rigid than said socket so as to be conformable to said headlight back surface, said sealing boot having a peripheral conical skirt and a pair of pockets fitted over and containing said socket ears so as to help retain said sealing boot to said socket and so as to cooperatively form a compression pad of dual flexibility, whereby, as said housing is added to said headlight assembly, the less rigid pockets are directly engaged by said housing inner surface and compressed first, thereby indirectly flexing the more rigid socket ears, which flexing in turn distributes the force of said compression to said socket to positively retain said socket to said headlight, said compression force in turn being distributed through said socket to said conical skirt so as to conform conical skirt evenly to said headlight back surface to seal around said headlight terminal, with any variation in the spacing of said socket ears from said housing inner surface being partially absorbed and compensated by the compression of the less rigid sealing boot pockets so as to lessen the impact of the angular variation of said headlight terminals.

* * * * *